W. V. Wallace,
Spike.
No. 96,060.   Patented Oct. 19, 1869.
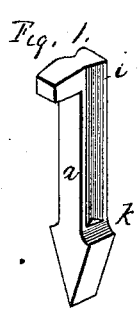
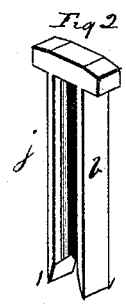
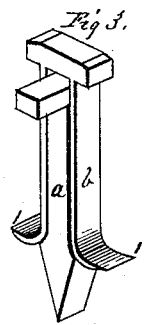
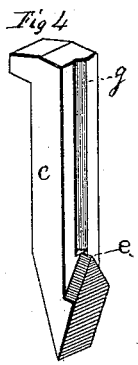
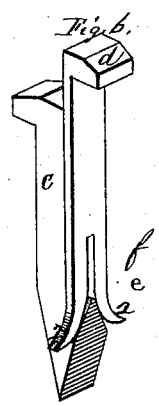
Witnesses:
Robert M. Calvert
T. M. Hanson
Inventor:
William V. Wallace,
by
B. F. James,
his atty.

United States Patent Office.

WILLIAM V. WALLACE, OF NEW YORK, N. Y.

Letters Patent No. 96,060, dated October 19, 1869.

---

IMPROVEMENT IN SPIKES.

---

The Schedule referred to in these Letters Patent and making part of the same.

---

*To all whom it may concern:*

Be it known that I, WILLIAM V. WALLACE, of the city, county, and State of New York, have invented a new and useful Improvement in "Railway-Spikes;" and I do hereby declare the following to be a true, clear, and exact description of the construction and operation of the same.

The nature of my invention consists in the construction of spikes, in two parts, two different forms involving substantially the same principle, all herein shown and described.

The lower portion of the spike proper is made somewhat of an arrow-head shape, in one instance having an inverted wedge-shape projection upon one side thereof, so that the portion used as a clinch shall, when coming in contact with the wedge above referred to, the driving down of the clinch will cause the points, or lower ends thereof to diverge, and operate to clinch and fasten the spike in the material into which it is driven.

To enable others skilled in the art to make and use my invention, I will proceed to describe the construction and operation of the same.

Figures 1, 2, and 3, illustrate one form of my improved spike.

Fig. 1 shows the shape of the main portion of the same, it being formed with the usual head upon it, and its point being a wedge or arrow-shape.

At the point K it is rounded up, until it meets the main body of the spike.

A groove, *i*, is formed on each side of this spike, to receive upon and within it the cap and clincher *b*, with its projecting ribs *j*, as seen in fig. 2.

The spike, fig. 1, is first driven where needed, and the wedge-shape of its point leaves a sufficient space around the shank of the spike to receive the cap *b*, which, when driven down, the lower ends or points of the same, as at 1 1 1, coming in contact with the portion K of the spike, will be impelled outward, as shown in fig. 3, and the whole will be firmly clinched and held in position.

Figures 4, 5, and 6, represent a modification of this spike, fig. 4 being the spike proper, fig. 5, the clincher, and fig. 6, the positions of the same when driven.

This spike is formed with a wedge-shaped projection, *e*, upon its back side, containing also the groove *g*. The spike being first driven home, the clincher *d*, containing upon it the rib *h*, is driven down upon the spike *c*, the rib *h* fitting into the groove *g*, and when the points 2 2 are forced upon the wedge *e*, these points, by reason of the split or slot *f* being cut upon the clincher *d*, will be separated and diverge, as shown in fig. 6, thereby firmly retaining the spike in position.

What I claim as my invention, and desire to secure by Letters Patent, is—

1. The combination of a spike, for railroad or other purposes, containing upon its shank, above the wedge-shaped point, grooves running to the top or head thereof, with a double-pronged clincher, containing a rib or ribs to fit into the aforesaid grooves, in the manner and for the purposes herein described.

2. The combination of the spike *a*, and its cap and double-pronged clincher *b*, as and for the purposes herein described.

WM. V. WALLACE.

Witnesses:
 NATHANIEL GILL,
 WM. H. CLARKSON.